(12) United States Patent
Allamsetty

(10) Patent No.: US 9,569,856 B2
(45) Date of Patent: Feb. 14, 2017

(54) VARIABLE BLOCKING ARTIFACT SIZE AND OFFSET DETECTION

(71) Applicant: Tektronix, Inc., Beaverton, OR (US)

(72) Inventor: Venkataravi Allamsetty, Andhra Pradesh (IN)

(73) Assignee: Tektronix, Inc., Beaverton, OR (US)

( * ) Notice: Subject to any disclaimer, the term of this patent is extended or adjusted under 35 U.S.C. 154(b) by 42 days.

(21) Appl. No.: 14/172,774

(22) Filed: Feb. 4, 2014

(65) Prior Publication Data

US 2014/0294316 A1 Oct. 2, 2014

(30) Foreign Application Priority Data

Mar. 26, 2013 (IN) .......................... 1146/MUM/2013

(51) Int. Cl.
*G06T 7/00* (2006.01)
*H04N 19/86* (2014.01)

(52) U.S. Cl.
CPC ........... *G06T 7/0085* (2013.01); *H04N 19/865* (2014.11)

(58) Field of Classification Search
CPC ......... G06T 7/0079; G06T 7/0085; G06T 9/20
USPC ...................................... 382/232, 233, 260
See application file for complete search history.

(56) References Cited

U.S. PATENT DOCUMENTS

| 6,418,242 | B1* | 7/2002 | Maurer | 382/266 |
| 8,077,774 | B1 | 12/2011 | Dawson | |
| 2010/0194933 | A1* | 8/2010 | Sasaki | 348/241 |
| 2010/0226573 | A1* | 9/2010 | Lertrattanapanich et al. | 382/168 |
| 2011/0019934 | A1* | 1/2011 | Ledinh et al. | 382/261 |
| 2011/0129156 | A1* | 6/2011 | Liao et al. | 382/199 |
| 2011/0292998 | A1* | 12/2011 | Ohgose | H04N 19/176 375/240.08 |
| 2012/0219215 | A1* | 8/2012 | Lukac | 382/165 |
| 2014/0192891 | A1* | 7/2014 | Alshina et al. | 375/240.24 |

FOREIGN PATENT DOCUMENTS

| EP | 1168823 A3 | 2/2002 |
| WO | 0120912 A1 | 3/2001 |
| WO | 2007020572 A1 | 2/2007 |

OTHER PUBLICATIONS

Lin, W. S. et al., "Digital Image Source Coder Forensics Via Intrinsic Fingerprints," IEEE Transactions on Information Forensics and Security, Piscataway, NJ, vol. 4, No. 3, Sep. 1, 2009, pp. 460-475.

Ko, H. et al., "A New In-Loop Filter for Depth Map Coding in HEVC," Signal & Information Processing Association Annual Summit and Conference, 2012 Asia-Pacific, Dec. 3, 2012, pp. 1-7.

(Continued)

*Primary Examiner* — Kim Vu
*Assistant Examiner* — Molly Delaney
(74) *Attorney, Agent, or Firm* — Michael A. Nelson; Marger Johnson

(57) ABSTRACT

An aspect of the invention includes a system and method for determining a block size and offset for a block artifact. A content is identified. The content can be an image, a frame of video, or any other appropriate content. Edge differences are calculated in each dimension of the content based on the pixel values. The edge differences are filtered. From the filtered edge differences, block attributes, such as block size and offset, can be determined.

13 Claims, 10 Drawing Sheets

(56) References Cited

OTHER PUBLICATIONS

Chen, C. et al., "A Blind Reference-Free Blockiness Measure," Sep. 21, 2010, Advances in Multimedia Information Processing, Springer Berlin Heidelberg, pp. 112-123.
European Search Report for Application No. EP1168823, dated Jun. 26, 2014, 12 pages.

\* cited by examiner

VARIABLE BLOCKING ARTIFACT SIZE AND OFFSET DETECTION

FIELD OF THE INVENTION

This disclosure pertains to image and video content, and more particularly to identifying blocking artifact sizes and offsets in image and video content.

BACKGROUND

Block based transform coding is the most popular approach for image and video coding. Most of the current image and video coding standards, such as JPEG, H.26x, and MPEG, make use of the block based discrete cosine transform. Generally this transform is applied on blocks of size 8×8; in H.264 this transform is applied on blocks of size 4×4 (the minimum size). In the decoder, the quantized transform coefficients are de-quantized and inverse transformed to recover the original image. So at low bitrate image and video coding blocking artifacts of size 8×8 or 4×4, or integral multiple of these sizes can be expected.

But in practice the blocking artifact sizes may change because of spatial scaling and also deviation in blocking grid might occur. So without detecting the exact blocking artifact size and grid position, blockiness metrics might turn out to be useless, as blockiness is calculated at wrong pixel positions and with wrong blocking artifact size. So the proper blockiness metrics should find the blocking artifact size and offsets before calculating the blockiness score.

A need remains for a way to address these and other problems associated with the prior art.

SUMMARY OF THE INVENTION

Aspects of the invention include a computer system. Stored in the computer system is content. The content is analyzed to determine edge differences. The edge differences are filtered, from which block attributes, such as block size and offset, can be calculated.

DETAILED DESCRIPTION

Figure 1:
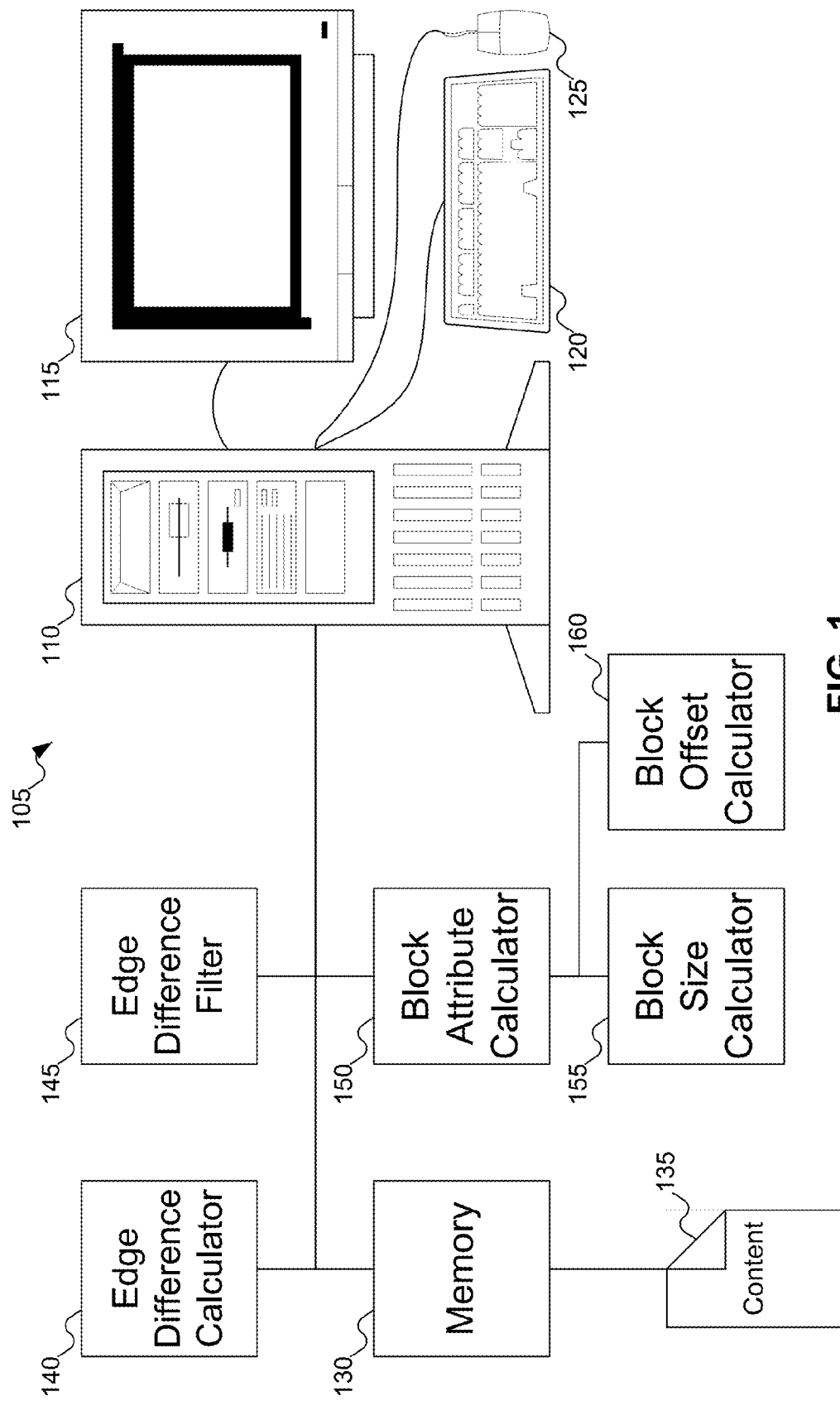
FIG. 1 shows a computer system to determine block attributes in content, according to an embodiment of the invention.

FIG. 1 shows a computer system to determine block attributes in content, according to an embodiment of the invention. In FIG. 1, computer system 105 is shown as including computer 110, monitor 115, keyboard 120, and mouse 125. A person skilled in the art will recognize that other components can be included with computer system 105: for example, other input/output devices, such as a printer. In addition, FIG. 1 computer system 105 can include conventional internal components: for example, central processing unit (not shown), memory 130, storage (not shown), etc. Although not shown in FIG. 1, a person skilled in the art will recognize that computer system 105 can interact with other computer systems, either directly or over a network (not shown) of any type. Finally, although FIG. 1 shows computer system 105 as a conventional desktop computer, a person skilled in the art will recognize that computer system 105 can be any type of machine or computing device capable of providing the services attributed herein to computer system 105, including, for example, a laptop computer, a personal digital assistant (PDA), or a cellular telephone.

Computer 110 includes components that be used to determine block attributes for content 135, shown as stored in memory 130. Computer 110 can include edge difference calculator 140, edge difference filter 145, and block attribute calculator 150. Edge difference calculator 140 can be used to determine edge differences, as discussed below with reference to FIGS. 2-4. Edge difference filter 145 can be used to filter the edge differences produced by edge difference calculator 140, as discussed below with reference to FIGS. 5-7. Finally, block attribute calculator 150 can be used to determine block attributes for the content from the filtered edge differences.

As part of calculating block attributes, block attribute calculator 150 can include block size calculator 155 and block offset calculator 160. Block size calculator 155 can determine the size of the block artifact. Block offset calculator 160 can determine the offset of the block artifact.

Assuming that the content is two-dimensional (i.e., an image or a frame from a video segment), block attribute calculator 150 (and therefore block size calculator 155 and block offset calculator 160) operate in each dimension separately. That is, the size of the block artifact, and its offset, can be determined in one dimension (e.g., vertically) without reference to the other dimension (e.g., horizontally). This means that if block artifacts can exist in more than two dimensions, the claimed invention could be used to determine the block artifact attributes in each dimension independently of the other dimensions.

Although FIG. 1 shows content 135 stored in memory 130, a person skilled in the art will recognize that content 135 can be stored at any desired location. For example, content 135 can be retrieved by computer system 105 from a networked location. Or content 135 can be read from a portable storage device, such as a USB key, compact disc, DVD, or Blu-ray disc, among other possibilities. A person skilled in the art will recognize other possible sources for content 135.

Figure 2:
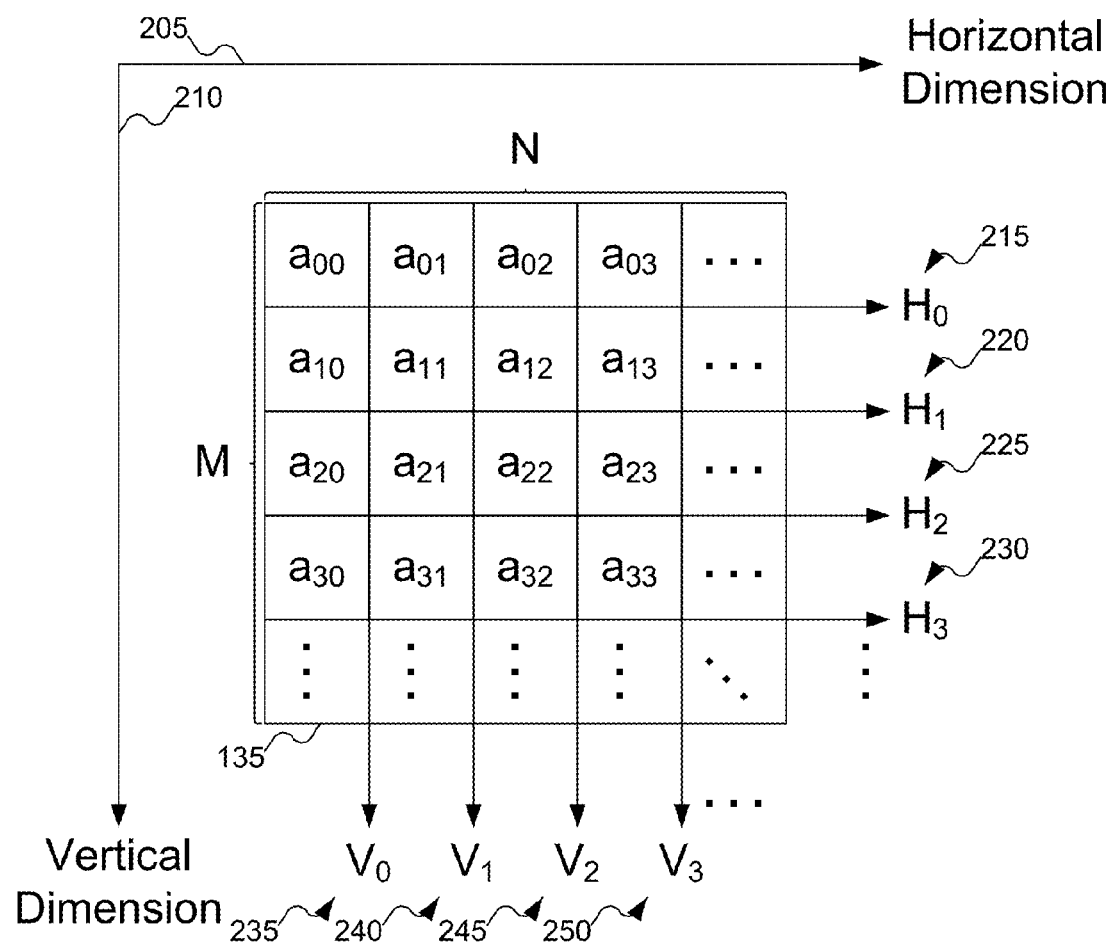
FIG. 2 shows edge differences being calculated in the content of FIG. 1.

FIG. 2 shows edge differences being calculated in the content of FIG. 1. In FIG. 2, content 135 is shown as having M rows and N columns of pixels. As discussed above, content 135 can be an image, or content 135 can be a frame from a video file, among other possibilities. The rows of content 135 can be said to run in horizontal dimension 205, and the columns of content 135 can be said to run in vertical dimension 210.

Given the pixels in content 135, edge differences can be calculated in each dimension. Thus, for example, horizontal edge differences 215, 220, 225, and 230 are shown in horizontal dimension 205, and vertical edge differences 235, 240, 245, and 250 are shown in vertical dimension 210.

The edge differences are calculated using the following formulas:

$$V_i = \frac{1}{N} \sum_{j=0}^{N-1} \mathrm{ABS}(a_{ji} - a_{j(i+1)})$$

$$H_i = \frac{1}{M} \sum_{j=0}^{M-1} \mathrm{ABS}(a_{ij} - a_{(i+1)j})$$

If there are N columns of pixels, then there are N−1 vertical edge differences. Similarly, if there are M rows of pixels, then there are M−1 horizontal edge differences. These edge differences can be plotted on a graph, as shown in FIGS. 3 and 4.

Figure 3:
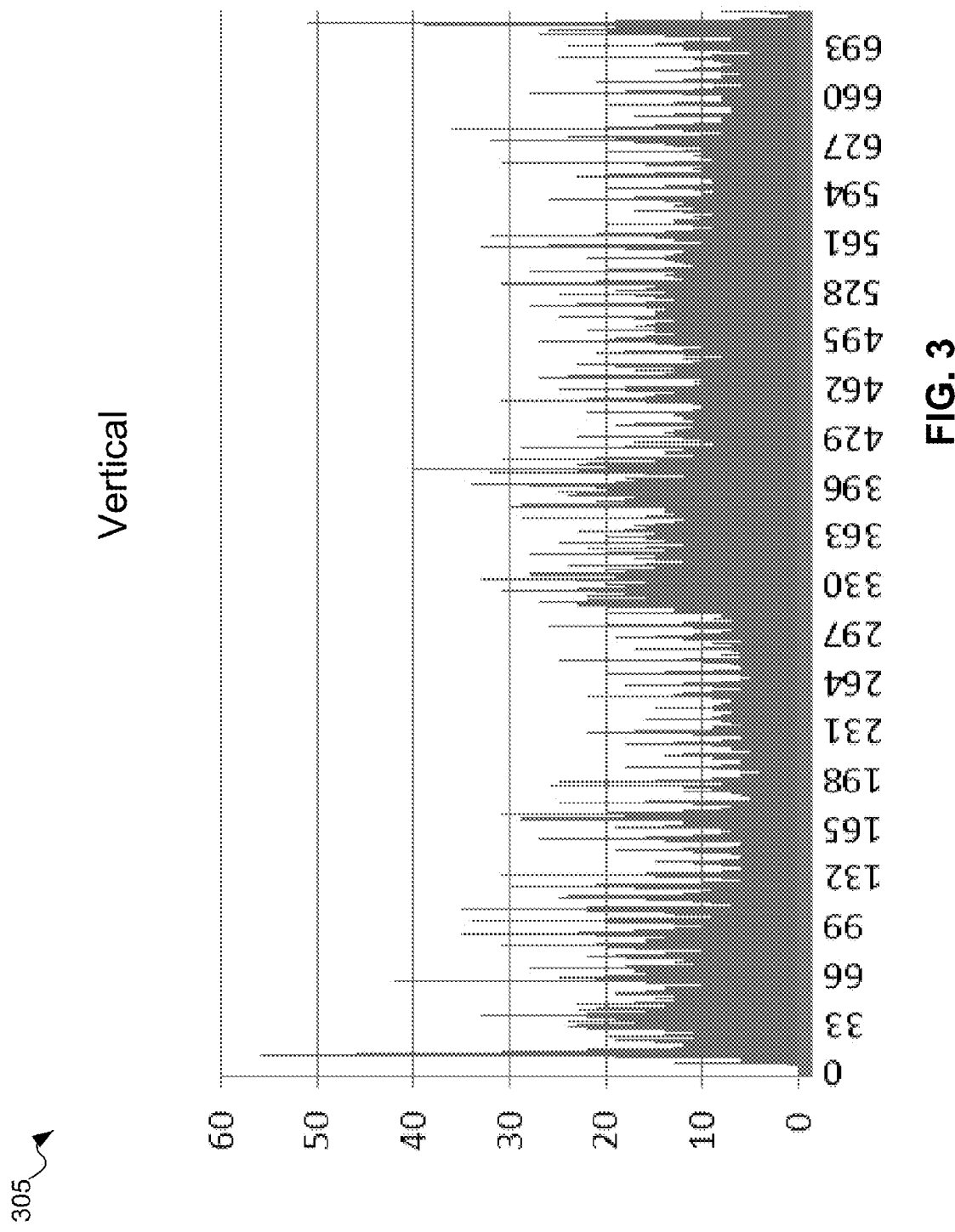
FIGS. 3 and 4 show the edge differences of FIG. 2 plotted in the vertical and horizontal dimensions on a graph respectively.
Figure 4:
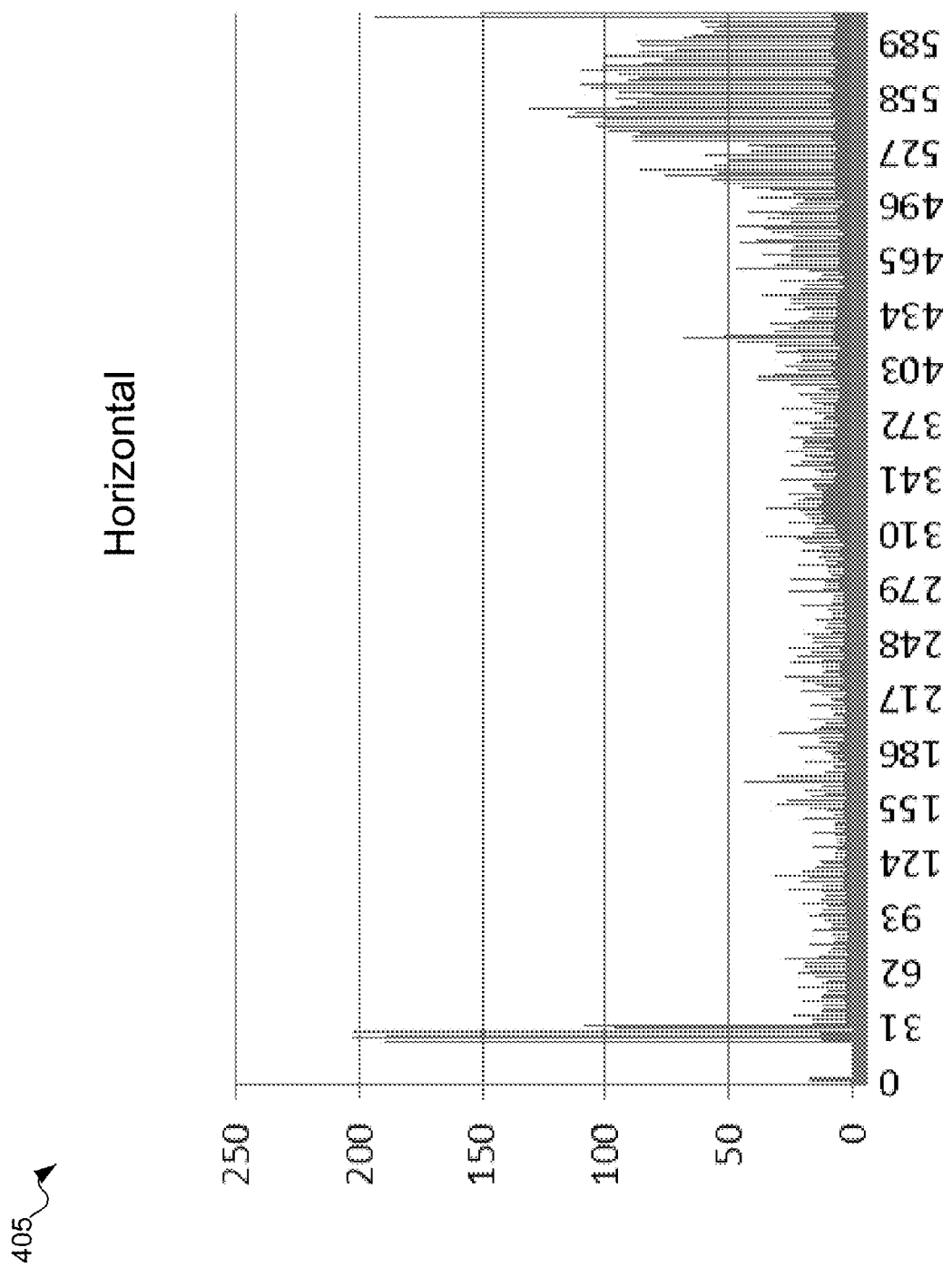

Although it might be possible to calculate block attributes directly from the edge differences shown in FIGS. 3 and 4, there is a lot of information to process. To simplify the calculation of block attributes, the edge differences can be filtered.

Figure 5:
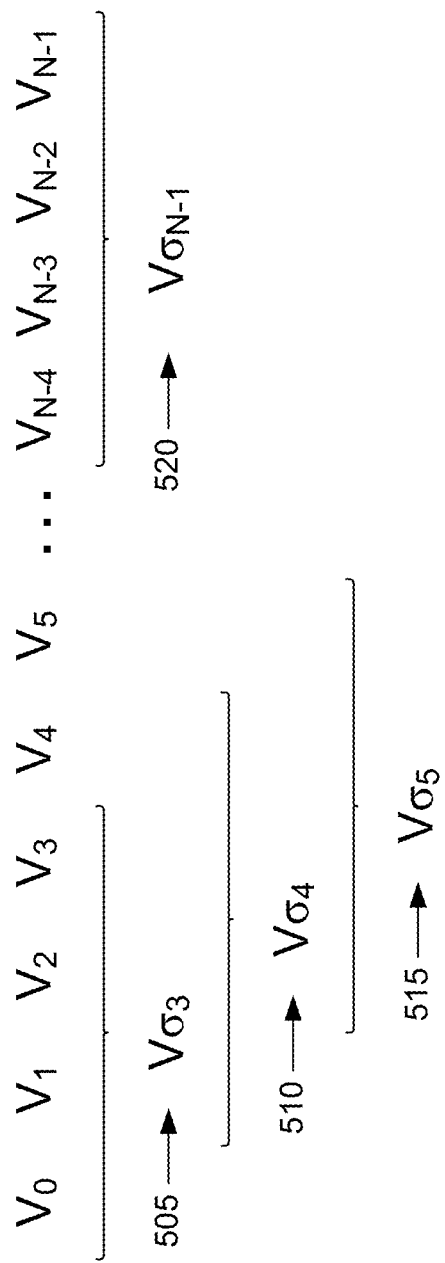
FIG. 5 shows calculating a rolling standard deviation of the edge differences in the vertical dimension of FIG. 2.

FIG. 5 shows calculating a rolling standard deviation of the edge differences in the vertical dimension of FIG. 2. In FIG. 5, four edge differences are taken: a given edge difference and the three edge differences preceding it. The standard deviation of these edge differences can be calculated: the value can be called $\sigma_i$. For clarity, standard deviations that are calculated using vertical edge differences can be labeled $V\sigma_i$, and horizontal edge differences can be labeled $H\sigma_i$.

Using four edge differences, and three of those being to the left of a given edge difference, has some advantages. Using four edge differences takes advantage of the fact that block artifacts sizes are typically multiples of four. And using edge differences to the left of a given edge difference takes advantage of the fact that when all the edge differences are part of the block artifact, the standard deviation is significantly different than that of edge differences that are not part of a block artifact.

Once the rolling standard deviations are calculated, they can be compared pairwise. If the difference between $\sigma_i$ and $\sigma_{i-1}$ is greater than 1, then edge difference V, can be included in the filtered edge differences. Otherwise, V, can be removed from the filtered edge differences.

In the above description, the difference between adjacent rolling standard deviations is compared with the threshold value of 1. But any threshold value can be used. The higher the threshold value, fewer edge differences will be included in the filtered edge differences. Conversely, the lower the threshold value, more edge differences will be included in the filtered edge differences.

Figure 6:
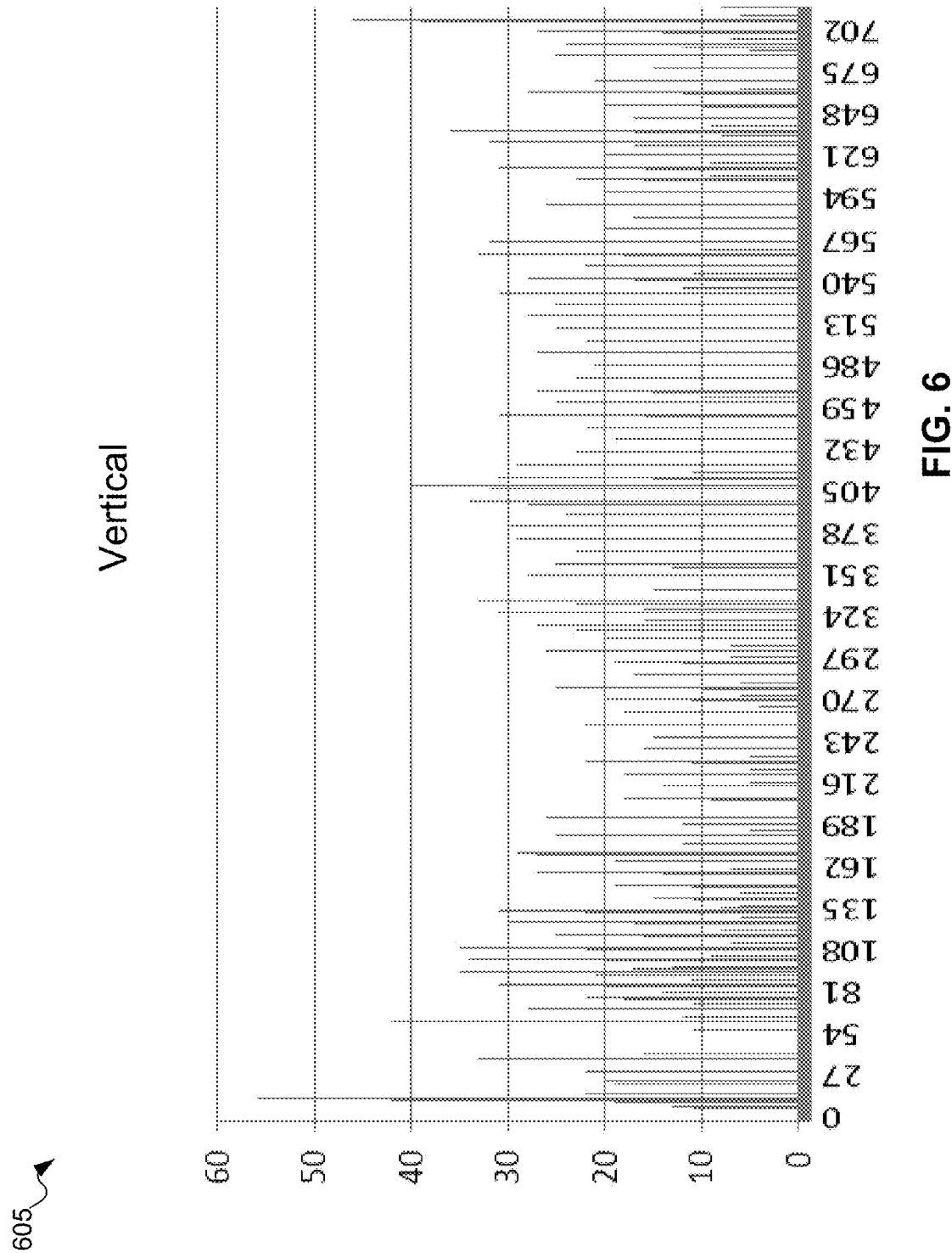
FIGS. 6 and 7 show the edge differences of FIGS. 3 and 4 filtered using rolling standard deviations as shown in FIG. 5, respectively.
Figure 7:
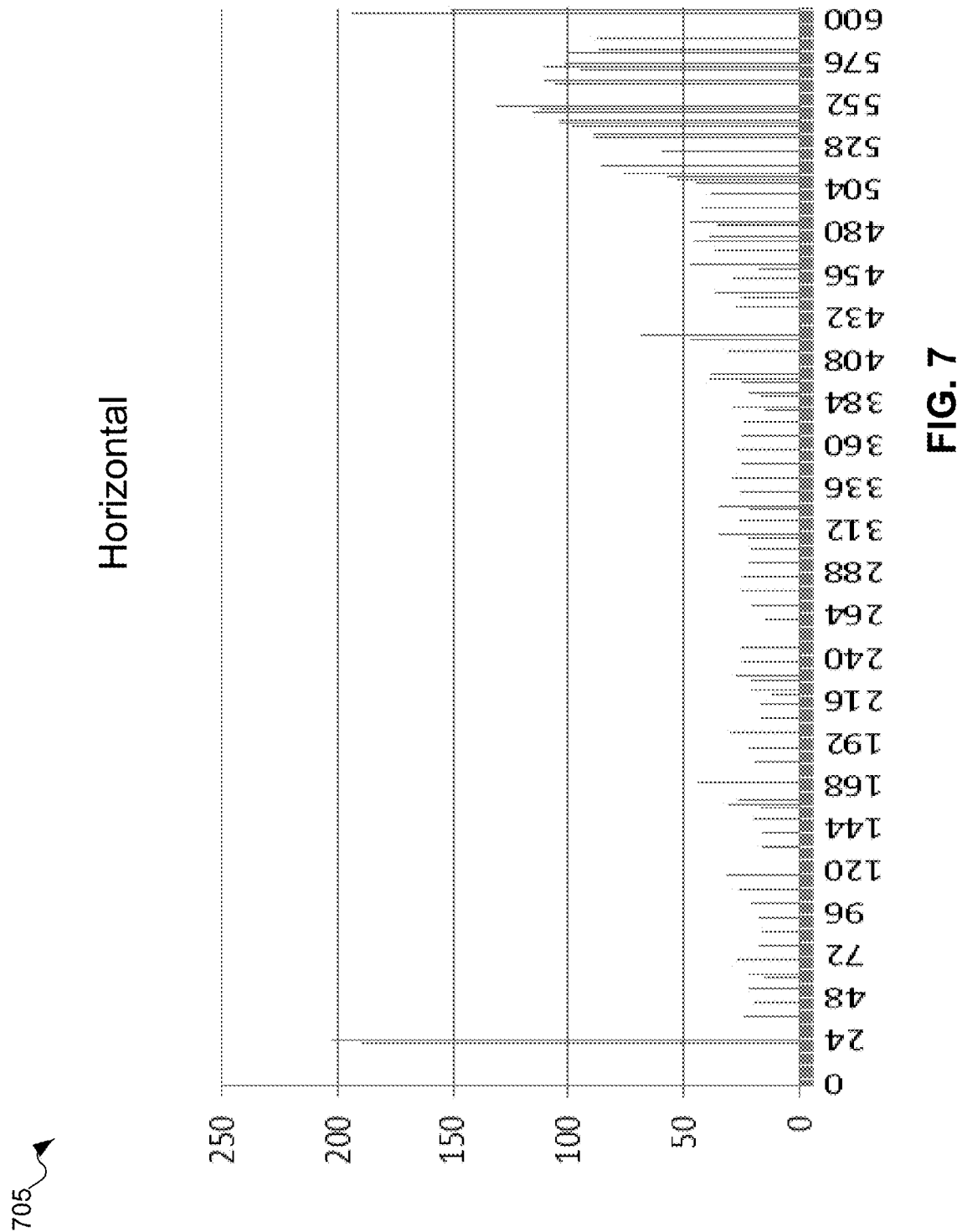

Using the rolling standard deviations, the edge differences can be filtered to produce filtered edge differences. The filtered edge differences will typically be fewer in number than the complete edge differences. FIGS. 6 and 7 show the edge differences of FIGS. 3 and 4 filtered using rolling standard deviations as shown in FIG. 5.

Block attributes can be determined from the filtered edge differences. For example, the block size can be determined as the most common difference between adjacent filtered edge differences, and the block offset can be determined as the most common remainder after dividing the index of a filtered edge difference, that corresponds to an edge of a block, by the block size.

Figure 8:
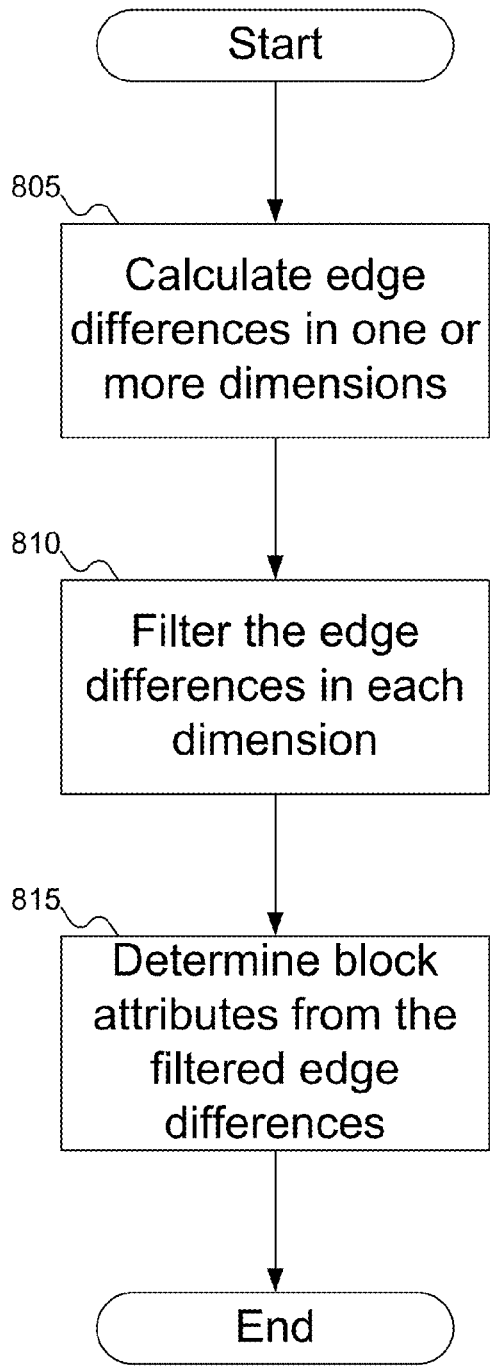
FIG. 8 shows a flowchart of a procedure to determine block attributes for content in the system of FIG. 1, according to an embodiment of the invention.

FIG. 8 shows a flowchart of a procedure to determine block attributes for content in the system of FIG. 1, according to an embodiment of the invention. In FIG. 8, at operation 805, the edge differences are calculated in one or more dimensions. At operation 810, the edge differences are filtered in each dimension. At operation 815, the block attributes are calculated based on the filtered edge differences.

Figure 9:
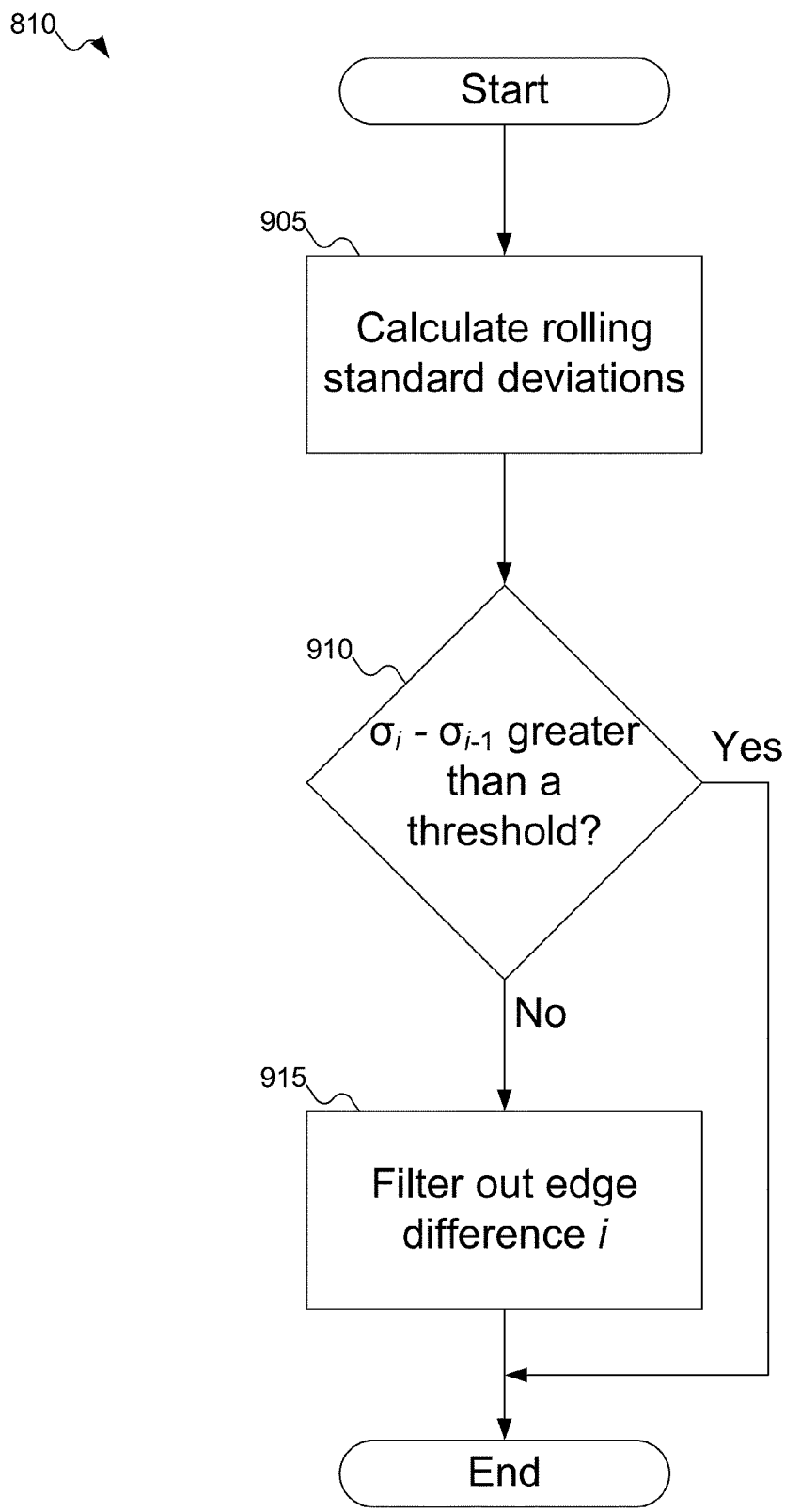
FIG. 9 shows details of how to filter edge differences in the flowchart of FIG. 8.

FIG. 9 shows details of how to filter edge differences in the flowchart of FIG. 8. In FIG. 8, at operation 905, the rolling standard deviations are calculated. At operation 910, the difference between adjacent standard deviations is calculated and compared with the threshold value. If the difference is less than the threshold value, then at operation 915, the corresponding edge difference is filtered out. Otherwise, the corresponding edge difference is included in the filtered edge differences.

Figure 10:
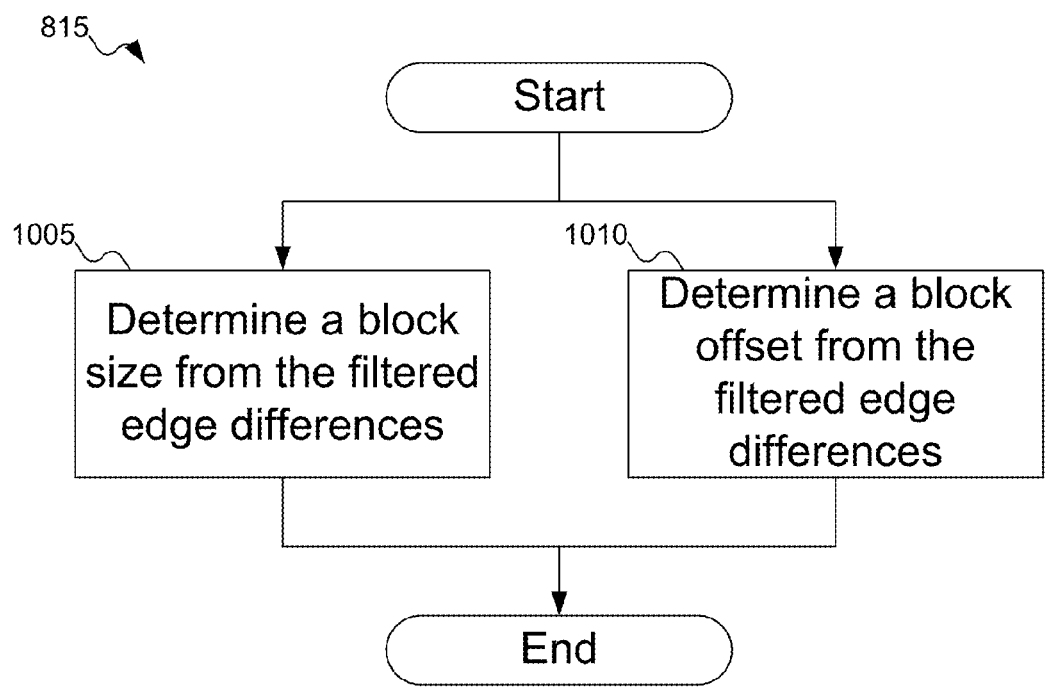
FIG. 10 shows details of how to determine block attributes in the flowchart of FIG. 8.

FIG. 10 shows details of how to determine block attributes in the flowchart of FIG. 8. In FIG. 10, at operation 1005, a block size can be determined from the filtered edge differences. Alternatively, at operation 1010, a block offset can be determined from the filtered edge differences.

The following discussion is intended to provide a brief, general description of a suitable machine in which certain aspects of the invention may be implemented. Typically, the machine includes a system bus to which is attached processors, memory, e.g., random access memory (RAM), read-only memory (ROM), or other state preserving medium, storage devices, a video interface, and input/output interface ports. The machine may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, or a system of communicatively coupled machines or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine may include embedded controllers, such as programmable or non-programmable logic devices or arrays, Application Specific Integrated Circuits, embedded computers, smart cards, and the like. The machine may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciated that network communication may utilize various wired and/or wireless short range or long range carriers and protocols, including radio frequency (RF), satellite, microwave, Institute of Electrical and Electronics Engineers (IEEE) 810.11, Bluetooth, optical, infrared, cable, laser, etc.

The invention may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Having described and illustrated the principles of the invention with reference to illustrated embodiments, it will be recognized that the illustrated embodiments may be modified in arrangement and detail without departing from such principles. And, though the foregoing discussion has focused on particular embodiments, other configurations are contemplated. In particular, even though expressions such as "in one embodiment" or the like are used herein, these phrases are meant to generally reference embodiment possibilities, and are not intended to limit the invention to particular embodiment configurations. As used herein, these terms may reference the same or different embodiments that are combinable into other embodiments.

Embodiments of the invention can extend to the following statements, without limitation:

An embodiment of the invention includes a system, comprising: a computer, a memory in the computer, a content stored in the memory of the computer, an edge difference calculator to calculate edge differences of the content in at least one dimension, an edge difference filter to filter the edge differences to produce filtered edge differences, and a block attribute calculator to determine a block attribute from the filtered edge differences.

An embodiment of the invention includes a system, comprising: a computer, a memory in the computer, a content stored in the memory of the computer, an edge difference calculator to calculate absolute differences between adjacent pixels in the content orthogonal to the at least one dimension, sum the absolute differences between the adjacent pixels orthogonal to the at least one dimension to produce a sum, and scale the sum by a number of pixels in the at least one dimension to produce edge differences of the content in at least one dimension, an edge difference filter to filter the edge differences to produce filtered edge differences, and a block attribute calculator to determine a block attribute from the filtered edge differences.

An embodiment of the invention includes a system, comprising: a computer, a memory in the computer, a content stored in the memory of the computer, an edge difference calculator to calculate edge differences of the content in at least one dimension, an edge difference filter to calculate rolling standard deviations of the edge differences and filter out a first edge difference for which a corresponding first rolling standard deviation is less than a predetermined threshold greater than a second rolling standard deviation corresponding to a second edge difference immediately preceding the first edge difference to produce filtered edge differences, and a block attribute calculator to determine a block attribute from the filtered edge differences.

An embodiment of the invention includes a system, comprising: a computer, a memory in the computer, a content stored in the memory of the computer, an edge difference calculator to calculate edge differences of the content in at least one dimension, an edge difference filter to calculate rolling standard deviations of the edge differences using four edge differences to calculate each rolling standard deviation and filter out a first edge difference for which a corresponding first rolling standard deviation is less than a predetermined threshold greater than a second rolling standard deviation corresponding to a second edge difference immediately preceding the first edge difference to produce filtered edge differences, and a block attribute calculator to determine a block attribute from the filtered edge differences.

An embodiment of the invention includes a system, comprising: a computer, a memory in the computer, a content stored in the memory of the computer, an edge difference calculator to calculate edge differences of the content in at least one dimension, an edge difference filter to calculate rolling standard deviations of the edge differences using a first edge difference and at least one edge difference immediately preceding the first edge difference to calculate a rolling standard deviation corresponding to the first edge difference and filter out a first edge difference for which a corresponding first rolling standard deviation is less than a predetermined threshold greater than a second rolling standard deviation corresponding to a second edge difference immediately preceding the first edge difference to produce filtered edge differences, and a block attribute calculator to determine a block attribute from the filtered edge differences.

An embodiment of the invention includes a system, comprising: a computer, a memory in the computer, a content stored in the memory of the computer, an edge difference calculator to calculate edge differences of the content in at least one dimension, an edge difference filter to filter the edge differences to produce filtered edge differences, and a block attribute calculator including a block size calculator to determine a block size from the filtered edge differences.

An embodiment of the invention includes a system, comprising: a computer, a memory in the computer, a content stored in the memory of the computer, an edge difference calculator to calculate edge differences of the content in at least one dimension, an edge difference filter to filter the edge differences to produce filtered edge differences, and a block attribute calculator including a block size calculator to determine a block size as a most common difference between adjacent filtered edge differences.

An embodiment of the invention includes a system, comprising: a computer, a memory in the computer, a content stored in the memory of the computer, an edge difference calculator to calculate edge differences of the content in at least one dimension, an edge difference filter to filter the edge differences to produce filtered edge differences, and a block attribute calculator including a block size calculator to determine a block size from the filtered edge differences and a block offset calculator to determine a block offset from the filtered edge differences.

An embodiment of the invention includes a system, comprising: a computer, a memory in the computer, a content stored in the memory of the computer, an edge difference calculator to calculate edge differences of the content in at least one dimension, an edge difference filter to filter the edge differences to produce filtered edge differences, and a block attribute calculator including a block size calculator to determine a block size from the filtered edge differences and a block offset calculator to determine a block offset as a number of pixels between a filtered edge difference and an edge of the content.

An embodiment of the invention includes a system, comprising: a computer, a memory in the computer, a content stored in the memory of the computer, an edge difference calculator to calculate vertical edge differences in a vertical dimension of the content and horizontal edge differences in a horizontal dimension of the content, an edge difference filter to filter the edge differences to produce filtered vertical edge differences and to filter the horizontal edge differences to produce filtered horizontal edge differences and a block attribute calculator to determine a first block attribute from the filtered vertical edge differences and a second block attribute from the filtered horizontal edge differences.

An embodiment of the invention includes a system, comprising: a computer, a memory in the computer, a content stored in the memory of the computer, an edge difference calculator to calculate edge differences of the content in at least one dimension, an edge difference filter to filter the edge differences to produce filtered edge differences, and a block attribute calculator to determine a block size and a block offset from the filtered edge differences.

An embodiment of the invention includes a method, comprising: calculating edge differences of a content in at least one dimension, filtering the edge differences to produce filtered edge differences, and determining at least one block attribute from the filtered edge differences.

An embodiment of the invention includes a method, comprising: calculating vertical edge differences in a vertical dimension and horizontal edge differences in a horizontal dimension of the content, filtering the vertical edge differences to produce filtered vertical edge differences, filtering the horizontal edge differences to produce filtered horizontal edge differences, determining at least a first block attribute from the filtered vertical edge differences, and determining at least a second block attribute from the filtered horizontal edge differences.

An embodiment of the invention includes a method, comprising: calculating absolute differences between adjacent pixels in the content orthogonal to the at least one dimension, summing the absolute differences between the adjacent pixels orthogonal to the at least one dimension to produce a sum, scaling the sum by a number of pixels in the at least one dimension to produce edge differences, filtering the edge differences to produce filtered edge differences, and determining at least one block attribute from the filtered edge differences.

An embodiment of the invention includes a method, comprising: calculating edge differences of a content in at least one dimension, calculating rolling standard deviations of the edge differences, filtering out a first edge difference for which a corresponding first rolling standard deviation is less than a predetermined threshold greater than a second rolling standard deviation corresponding to a second edge difference immediately preceding the first edge difference, and determining at least one block attribute from the filtered edge differences.

An embodiment of the invention includes a method, comprising: calculating edge differences of a content in at least one dimension, calculating rolling standard deviations of the edge differences using four edge differences, filtering out a first edge difference for which a corresponding first rolling standard deviation is less than a predetermined threshold greater than a second rolling standard deviation corresponding to a second edge difference immediately preceding the first edge difference, and determining at least one block attribute from the filtered edge differences.

An embodiment of the invention includes a method, comprising: calculating edge differences of a content in at least one dimension, calculating rolling standard deviations of the edge differences using a corresponding edge difference and at least one immediately preceding edge difference, filtering out a first edge difference for which a corresponding first rolling standard deviation is less than a predetermined threshold greater than a second rolling standard deviation corresponding to a second edge difference immediately preceding the first edge difference, and determining at least one block attribute from the filtered edge differences.

An embodiment of the invention includes a method, comprising: calculating edge differences of a content in at least one dimension, filtering the edge differences to produce filtered edge differences, and determining a block size from the filtered edge differences.

An embodiment of the invention includes a method, comprising: calculating edge differences of a content in at least one dimension, filtering the edge differences to produce filtered edge differences, and determining a block size as a most common difference between adjacent filtered edge differences.

An embodiment of the invention includes a method, comprising: calculating edge differences of a content in at least one dimension, filtering the edge differences to produce filtered edge differences, and determining a block size and a block offset from the filtered edge differences.

An embodiment of the invention includes a method, comprising: calculating edge differences of a content in at least one dimension, filtering the edge differences to produce filtered edge differences, and determining a block size and a block offset as a number of pixels between a filtered edge difference and an edge of the content from the filtered edge differences.

An embodiment of the invention includes a method, comprising: calculating edge differences of a content in at least one dimension, filtering the edge differences to produce filtered edge differences, determining a block size from the filtered edge differences, and determining a block offset from the filtered edge differences.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

The invention claimed is:

1. A system, comprising:
   a computer;
   a memory in the computer;
   a content stored in the memory of the computer, the content having pixels arranged in two or more dimensions;
   an edge difference calculator to calculate edge differences of the content in a first dimension of the two or more dimensions, the edge difference calculator being structured to calculate absolute differences within multiple sets of adjacent pixels in the content, the adjacent pixels within each of the multiple sets being adjacent in a dimension orthogonal to the first dimension and each pixel in each of the multiple sets of adjacent pixels being adjacent to a pixel in another set of the multiple sets, sum the absolute differences of the multiple sets of adjacent pixels to produce a sum, and scale the sum of the absolute differences by a number of pixels in the first dimension to produce the edge differences;
   an edge difference filter to filter said edge differences to produce filtered edge differences; and
   a block attribute calculator to determine a block attribute from said filtered edge differences.

2. A system according to claim 1, wherein the edge difference filter is structured to calculate rolling standard deviations of the edge differences and filter out a first edge difference for which a corresponding first rolling standard deviation is less than a predetermined threshold greater than a second rolling standard deviation corresponding to a second edge difference immediately preceding said first edge difference.

3. A system according to claim 1, wherein the block attribute calculator includes a block size calculator to determine a block size from said filtered edge differences.

4. A system according to claim 3, wherein the block size calculator is structured to determine said block size as a most common difference between adjacent filtered edge differences.

5. A system according to claim 3, wherein the block attribute calculator further includes a block offset calculator to determine a block offset from said filtered edge differences.

6. A system according to claim 5, wherein the block offset calculator is structured to determine said block offset as a number of pixels between a filtered edge difference and an edge of the content.

7. A method, comprising:
calculating edge differences of a content of pixels arranged in two or more dimensions, the calculating edge differences including:
calculating absolute differences within multiple sets of adjacent pixels in the content in a first dimension of the two or more dimensions, each set of the multiple sets of adjacent pixels being orthogonal to the first dimension of the two or more dimensions and each pixel in each of the multiple sets of adjacent pixels being adjacent to a pixel in another set of the multiple sets;
summing the absolute differences of the multiple sets of adjacent pixels to produce a sum; and
scaling the sum by a number of pixels in the first dimension of the two or more dimensions to produce the edge differences;
filtering the edge differences to produce filtered edge differences; and
determining at least one block attribute from the filtered edge differences.

8. A method according to claim 7, wherein:
the two or more dimensions includes N columns and M rows, where N and M are both greater than 1;
the calculating edge differences of a content includes:
calculating vertical edge differences of the M rows, in which each set of the multiple sets of adjacent pixels is orthogonal to a vertical dimension of the content when calculating the vertical edge differences, and
calculating horizontal edge differences of the N columns, in which each set of the multiple sets of adjacent pixels is orthogonal to a horizontal dimension of the content when calculating the horizontal edge differences;
the filtering the edge differences to produce filtered edge differences includes:
filtering the vertical edge differences to produce filtered vertical edge differences, and
filtering the horizontal edge differences to produce filtered horizontal edge differences; and
the determining at least one block attribute from the filtered edge differences includes:
determining at least a first block attribute from the filtered vertical edge differences, and
determining at least a second block attribute from the filtered horizontal edge differences.

9. A method according to claim 7, wherein the filtering the edge differences to produce filtered edge differences includes:
calculating rolling standard deviations of the edge differences; and
filtering out a first edge difference for which a corresponding first rolling standard deviation is less than a predetermined threshold greater than a second rolling standard deviation corresponding to a second edge difference immediately preceding the first edge difference.

10. A method according to claim 7, wherein the determining at least one block attribute from the filtered edge differences includes determining a block size from the filtered edge differences.

11. A method according to claim 10, wherein the determining a block size from the filtered edge differences includes determining the block size as a most common difference between adjacent filtered edge differences.

12. A method according to claim 10, wherein the determining at least one block attribute from the filtered edge differences further includes determining a block offset from the filtered edge differences.

13. A method according to claim 12, wherein the determining a block offset from the filtered edge differences includes determining the block offset as a number of pixels between a filtered edge difference and an edge of the content.

* * * * *